R. S. TROTT.
VEHICLE SPRING.
APPLICATION FILED JULY 19, 1909.
1,029,730.
Patented June 18, 1912.
3 SHEETS—SHEET 2.
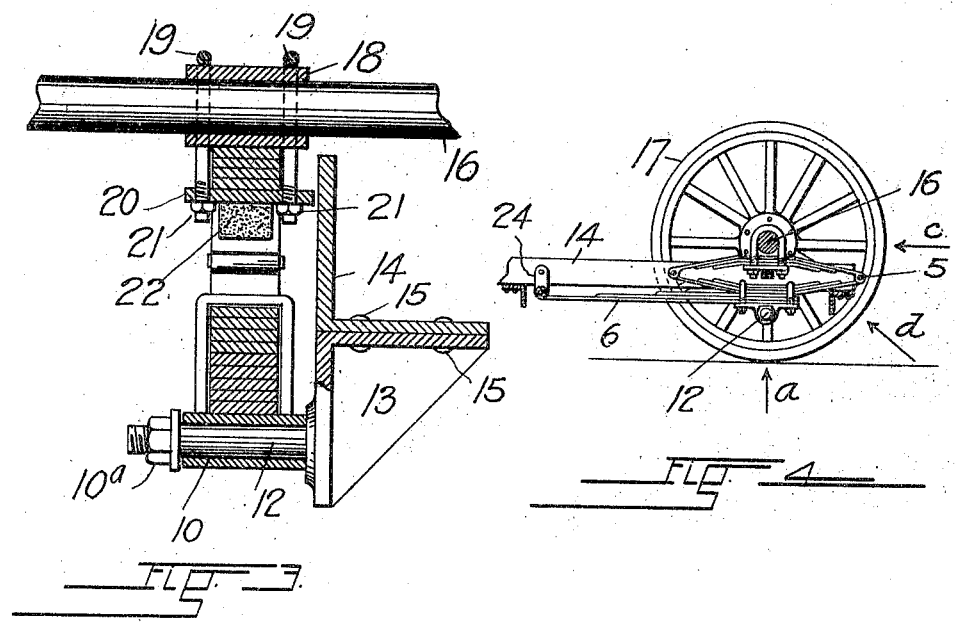
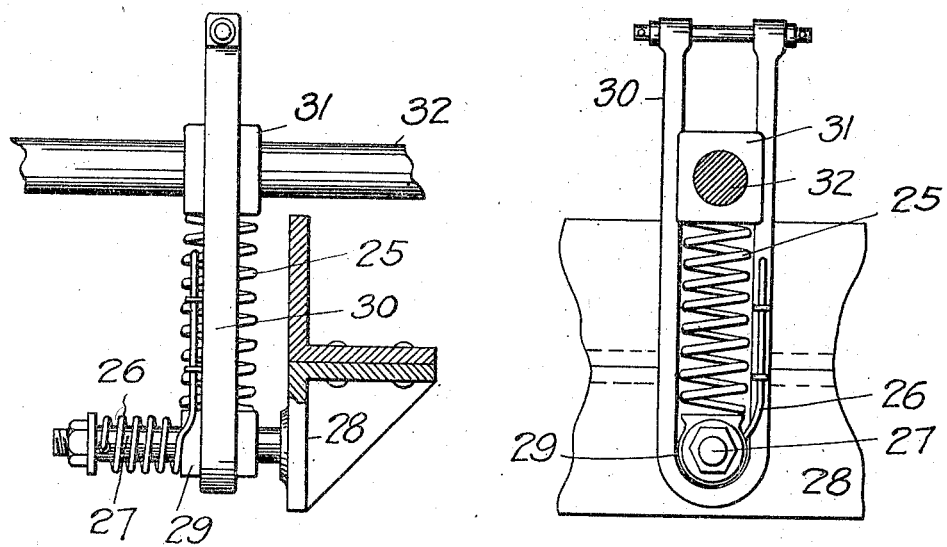
WITNESSES:
M. L. Geary.
F. H. Arno.
INVENTOR.
R. S. Trott
BY
ATTORNEY.

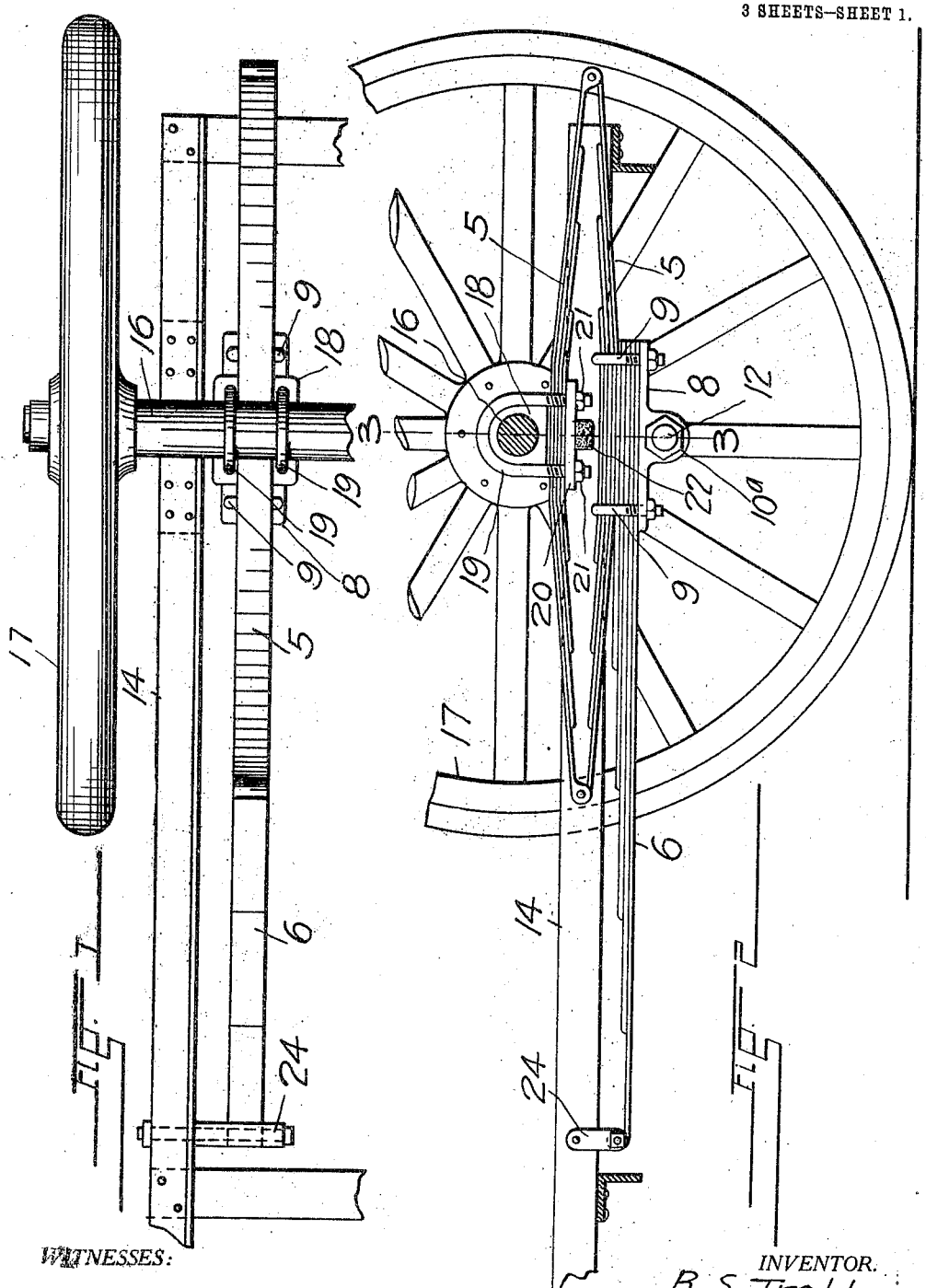

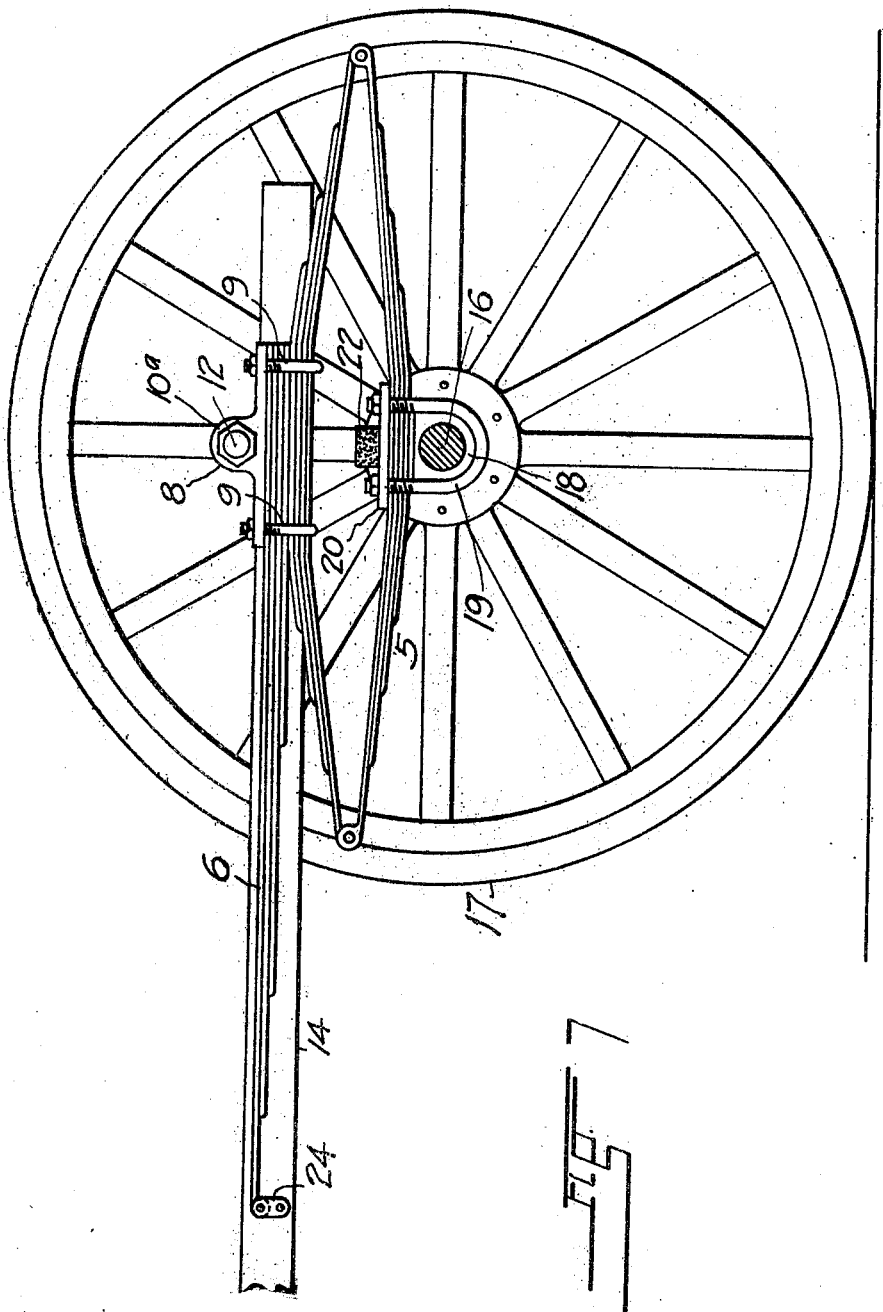

UNITED STATES PATENT OFFICE.

ROLLAND S. TROTT, OF DENVER, COLORADO.

VEHICLE-SPRING.

1,029,730.	Specification of Letters Patent.	Patented June 18, 1912.

Application filed July 19, 1909. Serial No. 508,415.

*To all whom it may concern:*

Be it known that I, ROLLAND S. TROTT, citizen of the United States of America, residing at Denver, in the county of Denver and State of Colorado, have invented certain new and useful Improvements in Vehicle-Springs, of which the following is a specification.

This invention relates to certain new and useful improvements in vehicle springs and its object is to provide an elastic contrivance which, when interposed between a vehicle frame and its axle, will, with equal effect absorb shocks directed vertically, horizontally or obliquely upon the latter when the wheels mounted thereon collide with obstructions on the road over which the vehicle is propelled. My improved spring will furthermore counteract the effect of the impact on the vehicle in case of a collision and moderate the pitching or rolling of the vehicle body.

My invention consists to this end, in its preferred form, in the provision of a compound spring, one member of which absorbs vertically-directed shocks while the other counteracts horizontally directed forces. The two members, coöperatively, deaden jars directed obliquely upon the axle or upon the vehicle body. When both wheels collide simultaneously with an obstruction on the road, the wheel axle and the pivotal axle which carries the springs will, by reason of the above described arrangement, move circularly with relation to each other while, if but one of the wheels encounters an obstruction, an oblique movement of the wheel axle with respect to the pivotal axles will tend to dissipate the effect of the shock. It will thus be observed that by the use of my compound spring the wheel and pivotal axles may move resiliently in a rectilinear direction with respect to each other or circularly about each other and thus absorb all shocks to which the wheels or the vehicle body are ordinarily subject.

In the accompanying drawings, Figure 1, represents a plan view of one of the wheels, the therewith connected axle, the adjacent portion of the frame and the interposed compound spring, Fig. 2, a side elevation thereof, Fig. 3, a vertical section taken along the line 3—3 Fig. 2, Fig. 4, a view similar to Fig. 2, drawn to a diminished scale, to show the direction of the shocks to which the wheels may be subjected without detrimental effect upon the vehicle body, by the interposition of my improved springs, Figs. 5 and 6 respectively front and side elevations of a modified construction of my invention and Fig. 7, a view similar to Fig. 2, in which the vehicle frame is disposed above the axle which carries the wheels.

My improved compound spring consists in its preferred form as stated hereinbefore, of two coöperative members 5 and 6, one of which is elliptic while the other is preferably rectilinear and like the first one, composed of a plurality of blades of varying lengths. The elliptic spring 5 is superimposed at its central portion, upon an extremity of the rectilinear member 6 and the two parts are rigidly connected to each other and to a subjacent bearing plate 8, by means of two clevises 9.

The plate above referred to, has in its central enlarged portion, a transverse bore 10, designed for the reception of a pivot axle 12 forming part of a bracket 13 which is rigidly secured to the vehicle frame 14, by means of rivets 15 or analogous fastening devices. A nut $10^a$ upon the correspondingly threaded extremity of the pin 12 is applied to prevent lateral displacement of the bearing plate and the therewith connected spring.

The vehicle axle 16 at the extremities of which the wheels 17, are rotatably mounted, is secured upon the upper surface of the elliptic member 5 by means of a hollow block 18 through which said axle projects and which is secured upon said member by means of clevises 19 the threaded ends of which project through a plate 20 placed below the upper portion of the spring 5, and are secured by nuts 21. A buffer 22 of elastic material is secured to the plate 20 for the purpose of limiting the collapsing movement of the spring 5.

The free extremity of the rectilinear spring 6 is movably suspended from the frame 14 by means of a link 24 whose function is to compensate by its oscillatory movement, for the variations in the distance between the ends of the spring while it is deflected.

A shock directed upon the wheel in a vertical direction (arrow *a* Fig. 4) is absorbed by the elliptic member 5 of the compound spring without materially affecting the other member 6; forces acting horizontally in the direction of the arrow *c* are counteracted by deflection of the rectilinear spring 6, while jars in a diagonal or oblique direction between the vertical and the horizontal, as indicated by the arrow d, are deadened by simultaneous action of the two members of the compound spring. The actions of the springs as above described are accompanied by a movement of either the wheel axle or the pivotal axle or both of them in a rectilinear direction toward each other vertically or horizontally, or circularly about each other and all shocks to which a vehicle is ordinarily subject, are thus effectively wholly or partially absorbed with the result that the movements of the vehicle body are rendered equable to an extent which obviates the employment of pneumatic or highly resilient wheel tires.

In the construction shown in Figs. 5 and 6, coiled springs 25 and 26 take the place of the two members 5 and 6 shown in the other figures. The pivot pin 27 on the bracket 28, projects in this form loosely through a block 29 which is connected to a U shaped element 30 in which the block 31 through which the wheel axle 32 extends, is slidably mounted. The spring 25 is interposed between the two blocks 29 and 31 and the spring 26 is wound around the outer portion of the pin 27 to which it is connected at one of its ends while its opposite extremity connects with the element 30.

Having thus described my invention what I claim is:—

1. The combination with a vehicle frame and a therewith associated wheel axle, of a spring interposed between the same and pivotally connected with the frame, said spring adapted to move circularly about the pivotal axis on the said frame, and a non-supporting alinement spring connected with the frame and with the first named spring in such a manner that it resiliently opposes the said circular movement.

2. The combination with a vehicle frame and a therewith associated wheel axle, of an interposed spring secured to the latter and pivotally connected with said frame at a point normally in approximately vertical alinement with the axle, a normally horizontal, rectilinear spring connected with the first named spring at a point intermediate the pivotal axis thereof on the vehicle frame and the wheel axle and an oscillatory member movably connecting the outer extremity of the said rectilinear spring with the vehicle frame.

3. The combination with a vehicle frame and a therewith associated wheel axle, of a spring interposed between the same, said spring being pivotally connected with the vehicle frame, and a non-supporting alinement spring connected with said vehicle frame and with the first named spring, said last-named spring adapted to resiliently oppose any endwise movement of the load bearing spring.

4. The combination with a vehicle frame and axle, of an interposed spring secured to the latter and pivotally connected with said frame, and a normally unstrained spring attached to the first-named spring and connected to the frame.

5. The combination with a vehicle frame and axle, of a spring interposed between the same, said spring being pivotally connected to the vehicle frame, and a non-supporting alinement spring connected with said vehicle frame and with the first named spring, said last-named spring adapted to resiliently oppose any circular movement of the axle about the pivot.

In testimony whereof I have affixed my signature in presence of two witnesses.

ROLLAND S. TROTT.

Witnesses:
G. J. ROLLANDET.
M. L. GEARY.